United States Patent

Nougayrede et al.

[11] Patent Number: 6,017,507
[45] Date of Patent: Jan. 25, 2000

[54] PROCESS FOR OXIDATION OF H₂S TO SULPHUR

[75] Inventors: Jean Nougayrede, Pau; André Philippe, Orthez; Sabine Savin-Poncet, Buros, all of France

[73] Assignee: Elf Aquitaine Productiion, Courbevoie, France

[21] Appl. No.: 08/860,581

[22] PCT Filed: Oct. 30, 1996

[86] PCT No.: PCT/FR96/01699

§ 371 Date: Aug. 25, 1997

§ 102(e) Date: Aug. 25, 1997

[87] PCT Pub. No.: WO97/17284

PCT Pub. Date: May 15, 1997

[30] Foreign Application Priority Data

Nov. 3, 1995 [FR] France ................................... 95 12989

[51] Int. Cl.⁷ .................................................. C01B 17/04
[52] U.S. Cl. .................................... 423/573.1; 423/576.2; 423/576.8; 423/DIG. 6
[58] Field of Search ................ 423/573.1, 576.8, 423/DIG. 6, 576.2

[56] References Cited

U.S. PATENT DOCUMENTS 2,971,824  2/1961  Johnson et al. ....................... 423/576.8

FOREIGN PATENT DOCUMENTS

| | | | |
|---|---|---|---|
| 749277 | 12/1966 | Canada ............................... | 423/576.8 |
| 0 078 690 A3 | 5/1983 | European Pat. Off. . | |
| 0 631 978 A1 | 1/1995 | European Pat. Off. . | |
| 2702674 A1 | 9/1994 | France ............................... | 423/576.8 |
| 239262 | 7/1969 | U.S.S.R. ............................. | 423/576.8 |
| 1504059 | 3/1978 | United Kingdom . | |
| WO 94/21555 | 9/1994 | WIPO . | |

Primary Examiner—Gary P. Straub
Assistant Examiner—Timothy C Vanoy
Attorney, Agent, or Firm—Burgess, Ryan & Wayne

[57] ABSTRACT

A process is provided for reducing the amount of hydrogen sulfide present in a tail gas from a sulfur recovery process. The hydrogen sulfide contaminated gas along with a gas containing free oxygen is passed through a series of hydrogen sulfide oxidation zones containing an oxidation catalyst, such as one or more oxides or salts of Ni, Co, Fe, Cu, Ag, Mn, Mo, Cr, W and V, deposited on a support, such as bauxite, activated alumina, titania and activated carbon. The initial and intermediate catalyst beds are operated adiabatically by injecting a substoichiometric amount of oxygen into the gas to be treated with respect to the amount of hydrogen sulfide present in the gas so that the temperature does not exceed 150° C. The final catalyst bed is operated under conditions such that a superstoichiometric amount of oxygen is injected into the gas with respect to the hydrogen sulfide and cooling is provided so that the temperature does not exceed 150° C. The invention is able to maintain an optimum selectivity toward sulfur during the catalytic oxidation of the hydrogen sulfide by controlling the temperature.

20 Claims, 1 Drawing Sheet

US 6,017,507

PROCESS FOR OXIDATION OF $H_2S$ TO SULPHUR

RELATED APPLICATIONS

This application is a national stage filing under 35 USC 371 of PCT/FR96/01699, filed Oct. 30, 1996.

BACKGROUND OF THE INVENTION

The invention relates to a process for complete oxidation to sulphur of the $H_2S$ present in a gas in a concentration of between 0.7% and 3% by volume. It also relates to the application of this process to the virtually total recovery, in the form of sulphur, of the sulphur compounds present in a residual gas from a sulphur plant.

The residual gases originating from a sulphur plant in which sulphur is produced by the Claus process for controlled oxidation of a sour gas containing $H_2S$, by means of a gas containing free oxygen, usually contain less than 4% by volume of sulphur compounds, a large proportion of which consists of $H_2S$, the remainder consisting of $SO_2$, COS, $CS_2$ and of sulphur vapour and/or vesicular sulphur.

Such residual gases are commonly treated in order to lower as much as possible the overall content of sulphur compounds with the aim of allowing them to be discharged to the atmosphere, after they have been burned, while conforming to the standards imposed by legislation relating to atmospheric pollution and simultaneously to recover these sulphur compounds in a form which contributes to increasing the yield of upgradable products formed from the sour gas treated in the sulphur plant.

Various processes for performing the treatment of a residual gas from a Claus sulphur plant are known, and especially processes comprising a combined hydrogenation and hydrolysis treatment of the residual gas with a view to converting the sulphur compounds which it contains into the form of $H_2S$ alone, and then a cooling of the effluent resulting from the said combined treatment to an appropriate temperature and, lastly, a treatment of the cooled gaseous effluent in order to remove $H_2S$ from it. This removal of $H_2S$ can be carried out either by absorption of the $H_2S$ by means of a selective solvent capable of being regenerated or else by controlled catalytic oxidation of the $H_2S$ to sulphur.

One of the processes of the abovementioned type, which comprise a removal of $H_2S$ by catalytic oxidation to sulphur, is the process described in citation FR-A-2702674, in which, after the combined hydrogenation and hydrolysis treatment of the residual gas originating from the sulphur plant, the gaseous effluent resulting from the treatment and containing $H_2S$ as the only sulphur compound is cooled to a temperature between the dew point of the water in the said effluent and 180° C. and the cooled gaseous effluent is brought, in the presence of a gas containing free oxygen, into contact with an oxidation catalyst promoting the selective oxidation of $H_2S$ to sulphur, while operating at temperatures which, throughout the duration of the contact, are maintained at values taken between the said dew point and 180° C. in order to oxidize the $H_2S$ present in the gaseous effluent substantially quantitatively to sulphur and to deposit virtually all of the sulphur formed on the oxidation catalyst and to obtain a gas stream practically free from $H_2S$.

According to the invention a process is proposed for complete catalytic oxidation to sulphur of the $H_2S$ present in a gas in a concentration of between 0.7% and 3% by volume, which constitutes an improvement to the catalytic oxidation stage of the process described in citation FR-A-2702674, in the sense that it makes it possible to control the temperature of the oxidation catalyst more efficiently and thus to maintain an optimum selectivity for sulphur during the catalytic oxidation of $H_2S$ in contact with the oxidation catalyst. The substitution of the improved process for catalytic oxidation of $H_2S$ according to the invention in the stage of catalytic oxidation of $H_2S$ of the process for the treatment of residual gas of a sulphur plant, described in citation FR-A-2702674, results in an improved process for the treatment of a residual gas from a sulphur plant, the result being the possibility, for the combined unit for the treatment of a sour gas, associating the sulphur plant and the plant for the treatment of residual gas from this sulphur plant, using the abovementioned improved process, to reach overall sulphur recovery yields of at least 99.9%.

BRIEF DESCRIPTION OF THE INVENTION

The process according to the invention for the complete oxidation to sulphur of the $H_2S$ present in a gas in a concentration of between 0.7% and 3% by volume, is of the type in which the operation is carried out in a catalytic oxidation unit comprising a plurality of catalytic oxidation stages arranged in series and including an initial stage, a final stage and optionally at least one intermediate stage, each of the said stages containing a catalyst promoting the selective oxidation of $H_2S$ to sulphur and functioning at temperatures which are lower than the dew point of the sulphur resulting from the oxidation, the gas to be treated containing $H_2S$ is introduced at the entry of the initial catalytic oxidation stage and the gas is passed successively through each of the catalytic oxidation stages in contact with the oxidation catalyst which they contain and, in addition, an injection of a gas containing free oxygen into each of the catalytic oxidation stages is performed in order to carry out in each catalytic oxidation stage an at least partial oxidation of the $H_2S$ in the gas passing through this stage to sulphur, by the oxygen in the gas containing free oxygen, the sulphur formed being deposited on the catalyst of each catalytic oxidation stage, and a purified gas with a low residual content of $H_2S$ is removed at the exit of the final catalytic oxidation stage, and is characterized in that the gas containing $H_2S$ is brought to a temperature of between 80° C. and 100° C. before it enters each of the catalytic oxidation stages, in that the quantity of gas containing free oxygen introduced into the initial catalytic oxidation stage and each of the optional intermediate stages is controlled in such a way that the temperature of the gaseous mixture at the exit of each of the said catalytic oxidation stages, which function adiabatically, is at most equal to the maximum temperature θs of the range of temperatures in which the oxidation catalyst is capable of promoting the required selective oxidation of $H_2S$ to sulphur and does not exceed 150° C., in that the quantity of gas containing free oxygen which is introduced into the final catalytic oxidation stage is controlled in order to provide a predetermined excess of oxygen in the purified gas entailing a total oxidation of the $H_2S$ flowing into the said final stage, and in that the oxidation of the $H_2S$ in the final catalytic oxidation stage is carried out at temperatures which are at most equal to the said temperature θs and do not exceed 150° C., if need be by cooling the said final catalytic stage by indirect heat exchange with a cold fluid.

BRIEF DESCRIPTION OF THE FIGURE

The FIGURE is a schematic representation of the process.

DETAILED DESCRIPTION OF THE INVENTION

Figure 1:
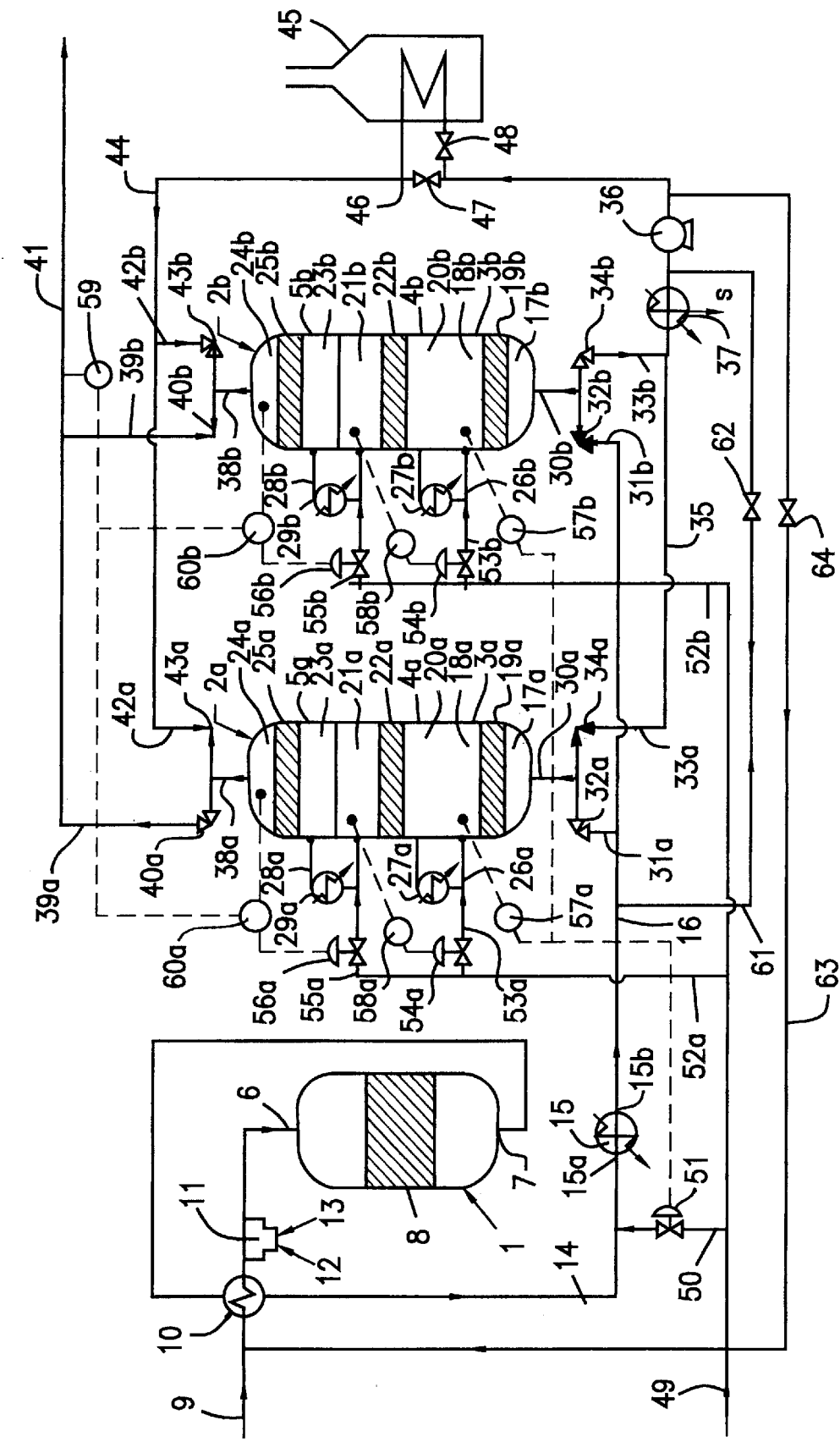

To bring the gas containing $H_2S$, that is either the gas to be treated containing $H_2S$ or else the gaseous mixture containing H$_2$S originating from each of the catalytic oxidation stages preceding the final catalytic oxidation stage, to the temperature of between 80° C. and 100° C. before it is introduced into the catalytic oxidation stage into which it is to be injected, the procedure followed is indirect heat exchange, external to the catalytic oxidation stages, with a fluid which has an appropriate temperature.

The gas containing free oxygen, introduced into each of the catalytic oxidation stages, may be delivered to the catalytic oxidation stage in question separately from the gas containing H$_2$S fed to this stage. It is preferable, however, to premix both these gases before they are injected into the catalytic oxidation stage into which they are to be introduced, in order to obtain a very homogeneous reaction mixture during the contact with the catalyst present in the said catalytic oxidation stage. The premixing is preferably carried out before the step of indirect heat exchange, external to the catalytic oxidation stages, which is intended to bring the gas containing H$_2$S to the temperature of between 80° C. and 100° C. before it is introduced into the catalytic oxidation stage in question.

The gas containing free oxygen, introduced into each of the catalytic oxidation stages is generally air, although it is possible to employ pure oxygen or else oxygen-enriched air or even mixtures, in various proportions, of oxygen and of one or several inert gases other than nitrogen.

The times of contact of the gaseous reaction mixture formed by bringing together the gas containing free oxygen and the gas containing H$_2$S in each of the catalytic oxidation stages with the oxidation catalyst present in the catalytic oxidation stage in question can range from 0.5 second to 15 seconds and more particularly from 1 second to 10 seconds, these values being given at standard conditions of temperature and pressure.

The quantity of gas containing free oxygen which is introduced into the final stage of catalytic oxidation is in excess in relation to the stoichiometric quantity required for completely oxidizing to sulphur all of the H$_2$S present in the gas containing H$_2$S entering the final stage. The excess can range up to fifteen times the stoichiometric quantity.

The various catalytic oxidation stages of the catalytic oxidation unit may contain the same oxidation catalyst or oxidation catalysts which differ from one catalytic oxidation stage to another. It is also possible to use a single oxidation catalyst or several oxidation catalysts in each catalytic oxidation stage, these catalysts being employed as a mixture or in the form of superposed distinct layers.

The oxidation catalyst or each oxidation catalyst present in a catalytic oxidation stage of the catalytic oxidation unit may be chosen from the various oxidation catalysts capable of promoting a selective conversion of H$_2$S to sulphur under the action of oxygen, that is to say of promoting the reaction H$_2$S+½O$_2$→S+H$_2$O, with a quantitative yield at temperatures not exceeding 150° C. and, for example, of the order of 90° C. to 130° C., the sulphur formed being deposited on the catalyst.

In particular, the catalyst of selective oxidation of H$_2$S to sulphur may consist of an active phase consisting of one or more oxides and/or salts of one or more transition metals such as Ni, Co, Fe, Cu, Ag, Mn, Mo, Cr, W and V, which is deposited on a support of a refractory material such as, for example, bauxite, activated and/or stabilized alumina, titanium oxide, zirconium oxide, silica, zeolites, silica/alumina mixtures, silica/titanium oxide mixtures, silica/zirconium oxide mixtures, refractory carbide or else on an active carbon support. The oxidation catalyst has a pore volume permitting a considerable sulphur loading. The pore volume of the catalyst advantageously represents 15 cm$^3$ to 70 cm$^3$ per 100 g of catalyst. The active phase, calculated as weight of metal, may represent 0.1% to 15% and, more especially, 0.2% to 7% of the weight of the oxidation catalyst.

To carry out a catalytic oxidation of H$_2$S to sulphur with an optimum efficiency in the catalytic oxidation unit it is necessary, throughout the stage of oxidation of the H$_2$S in the said unit, for the oxidation catalyst present in each catalytic oxidation stage of the catalytic oxidation unit to be at a temperature which is at most equal to the maximum temperature θs of the temperature range in the case of which the oxidation catalyst is capable of promoting the selective oxidation of H$_2$S to sulphur, without, however, exceeding 150° C. Temperatures ranging from 90° C. to θs, without exceeding 150° C., are especially suitable for carrying out the reaction of oxidation of H$_2$S to sulphur in each of the catalytic stages of the catalytic oxidation unit.

Maintaining of the temperature of the oxidation catalyst in the initial stage of catalytic oxidation and in each of the optional intermediate stages of catalytic oxidation, which function adiabatically, is performed by controlling the quantity of gas containing free oxygen which is introduced into each of the said catalytic oxidation stages. The final catalytic oxidation stage, which operates with a controlled excess of air in order to obtain a total elimination of H$_2$S in the purified gas leaving the catalytic oxidation unit, may function adiabatically when the H$_2$S content of the gas entering the said final stage is such that the temperature of the reaction mixture leaving this final stage, at the end of the oxidation of H$_2$S to sulphur, is at most equal to θs without, however, exceeding 150° C. If the H$_2$S concentration of the gas entering the final catalytic oxidation stage is such that the temperature of the reaction mixture resulting from the oxidation of H$_2$S to sulphur in the stage is liable to exceed the abovementioned maximum temperature, above which the oxidation catalyst no longer has the selectivity required for the oxidation of H$_2$S to sulphur, the heat energy released by the oxidation reaction is removed by subjecting the catalyst in the final catalytic oxidation stage to cooling by any known method, in order to maintain the temperature at which the oxidation reaction is utilized at the value chosen in order to preserve the selectivity for sulphur. It is possible, for example, to perform the cooling with the aid of a cold fluid circulating with indirect heat exchange with the catalyst in the final catalytic oxidation stage within the catalyst bed.

During the oxidation of H$_2$S to sulphur in the catalytic oxidation unit the catalysts in the catalytic oxidation stages of the unit become gradually laden with sulphur. Regeneration of the sulphur-laden oxidation catalysts is carried out at regular intervals by purging the catalysts with the aid of a nonoxidizing gas, the operation being carried out at temperatures of between 200° C. and 500° C., for example between 250° C. and 450° C., in order to vaporize the sulphur retained on the catalysts of the catalytic oxidation stages, and the regenerated catalysts are then cooled to the required temperature for a new application of the oxidation reaction, this cooling being performed by means of a gas which is at an appropriate temperature. The coolant may be optionally laden with water vapour, at least during the final stage of the cooling of the regenerated catalysts.

The purging gas employed for the regeneration of the sulphur-laden oxidation catalysts of the catalytic oxidation stages of the catalytic oxidation unit may be, for example, methane, nitrogen, CO$_2$ or mixtures of such gases or may consist of a fraction of the gas to be treated. The purging gas employed for the abovementioned regeneration may optionally contain a certain proportion of a gaseous reducing compound, for example $H_2$, CO or $H_2S$, at least during the final stage of the regeneration, that is to say after the vaporization of most of the sulphur deposited on the catalysts of the catalytic oxidation stages of the catalytic oxidation unit.

The oxidation of the $H_2S$ in the gas to be treated may be implemented in a single catalytic oxidation unit containing a plurality of catalytic oxidation stages arranged in series and including an initial stage and a final stage which are optionally separated by one or a number of intermediate stages, the unit operating alternately in a catalytic oxidation phase and in a regeneration/cooling phase. The operation is advantageously carried out by using a number of catalytic oxidation units such as those mentioned above, which operate in such a way that at least one of the said units is in a regeneration/cooling phase while the other units are in a catalytic oxidation phase. It is also possible to operate in a plurality of catalytic oxidation units of the above type, with one or more of the said units in the catalytic oxidation phase, at least one unit in a regeneration phase and at least one unit in a cooling phase.

The gas employed for the regeneration of the catalysts contained in the catalytic oxidation stages of a catalytic oxidation unit preferably circulates in a closed circuit, starting from a heating zone, passing successively through the catalytic oxidation stages of the catalytic oxidation unit in the course of regeneration and through a cooling zone in which most of the sulphur present in the said gas is separated by condensation, in order to return to the heating zone. The regeneration gas may also, of course, travel in an open circuit.

The gas employed for cooling the regenerated catalysts is of the same type as that used for the regeneration of the sulphur-laden catalysts. The regenerating gas and the cooling gas circuits may be independent from one another. However, according to one embodiment, the regenerating gas circuit defined above may also comprise a branch connecting the exit from its cooling zone to the entry of the catalytic oxidation unit in the course of regeneration while bypassing its heating zone, and this makes it possible to short-circuit the heating zone and thus to employ the regenerating gas as cooling gas.

The gas which is treated by the process according to the invention contains $H_2S$ as the only sulphur compound in a concentration of between 0.7% and 3% by volume. The said gas containing $H_2S$ may come from various sources. In particular, such a gas may be a natural gas with a low $H_2S$ content or else a gas originating from the gasification of coal or of heavy oils. Most particularly, the gas to which the process according to the invention is applied is a gas resulting from the application of a combined hydrogenation and hydrolysis step to a residual gas from a sulphur plant in order to convert into $H_2S$ all the sulphur compounds present in the residual gas.

During the combined hydrogenation and hydrolysis step, which is usually performed in the presence of a catalyst, the sulphur compounds such as $SO_2$, $CS_2$ and COS, as well as the sulphur vapour and/or vesicular sulphur present in the residual gas, are converted to $H_2S$ either under the action of hydrogen—in the case of $SO_2$ and of sulphur vapour and/or vesicular sulphur—or by hydrolysis—in the case of COS and $CS_2$—by the action of the water vapour present in the residual gas. The combined hydrogenation and hydrolysis treatment is carried out at temperatures that can range approximately from 140° C. to 550° C. and preferably lie approximately between 200° C. and 400° C. The hydrogen needed for the hydrogenation reaction may be already present in the residual gas or may be formed in situ in the hydrogenation and hydrolysis zone, for example by reaction of CO with $H_2O$ when the residual gas contains both these reactants, or may be added to the residual gas from an external source of hydrogen. A convenient way of supplying $H_2$ and CO to the residual gas consists in adding to the residual gas the combustion gases produced by a fuel gas burner operating below stoichiometry. The quantity of hydrogen to be employed must be sufficient to obtain a practically complete conversion to $H_2S$ of the hydrogenable sulphur compounds or products such as $SO_2$, sulphur vapour and/or vesicular sulphur, which are present in the residual gas subjected to the hydrogenation and hydrolysis treatment. In practice the quantity of hydrogen which is employed may range from 1 to 6 times the stoichiometric quantity required for converting to $H_2S$ the hydrogenable sulphur-containing products present in the residual gas.

If the residual gas does not contain sufficient water vapour for the hydrolysis of the organic sulphur compounds COS and $CS_2$, the required quantity of water vapour may be added to it before the combined hydrogenation and hydrolysis treatment is performed.

Catalysts which can be employed for the hydrogenation and hydrolysis treatment are those containing compounds of metals of groups Va, VIa and VIII of the Periodic Classification of the elements, for example compounds of metals such as cobalt, molybdenum, chromium, vanadium, thorium, nickel, tungsten or uranium, the compounds possibly being deposited on a support of the silica, alumina or silica/alumina type. Hydrodesulphurization catalysts based on cobalt and molybdenum oxides deposited on alumina are particularly effective for the hydrogenation and hydrolysis treatment. For this hydrogenation and hydrolysis treatment the contact times between the gaseous reaction mixture and the catalyst may vary quite widely. They advantageously lie between 0.5 and 8 seconds and more particularly between 1 and 5 seconds, these values being given at the standard conditions of pressure and temperature.

The gaseous effluent resulting from the combined hydrogenation and hydrolysis treatment, which generally contains $H_2S$ as the only sulphur compound in a volume concentration within the abovementioned limits is treated next in order to recover the $H_2S$ therefrom in the form of sulphur, by making use of the process according to the invention.

The invention will be better understood on reading the description given below of one of its embodiments which is incorporated into a process for the treatment of residual gas from a sulphur plant, the treatment process being used in the plant shown diagram-matically in the single figure of the appended drawing.

This plant combines a hydrogenation and hydrolysis reactor 1 and two catalytic oxidation units 2a and 2b, the catalytic oxidation units, which utilize the process according to the invention, -being mounted in parallel and each containing three catalytic oxidation stages arranged in series, each one being provided with a catalyst for selective oxidation of $H_2S$ to sulphur. More precisely, the catalytic oxidation unit 2a comprises an initial stage 3a, an intermediate stage 4a and a final catalytic oxidation stage 5a, whereas the catalytic oxidation unit 2b comprises an initial stage 3b, an intermediate stage 4b and a final catalytic oxidation stage 5b.

The hydrogenation and hydrolysis reactor 1 comprises an entry 6 and an exit 7, separated from each other by a stationary bed 8 of a catalyst for hydrogenation of $SO_2$ and of sulphur to $H_2S$ and for hydrolysis of the compounds COS and $CS_2$ to $H_2S$. A gas delivery conduit 9, in which are fitted the cold circuit of an indirect heat exchanger 10 of the gas/gas exchanger type and an in-line burner 11 for supplementary heating, provided with a fuel gas delivery pipe 12 and an air delivery pipe 13, connects the entry 6 of the hydrogenation and hydrolysis reactor 1 to the source of residual gas to be treated, for example to the exit of a sulphur plant which is not shown. The exit 7 of the hydrogenation and hydrolysis reactor 1 is extended by a discharge conduit 14 for the gases, the said conduit being connected, through the hot circuit of the indirect heat exchanger 10, to the entry 15a of an indirect heat exchanger 15, the exit 15b of which is extended by a conduit 16.

In the catalytic oxidation unit 2a the initial catalytic oxidation stage 3a has a first end 17a and a second end 18a which are separated by a stationary bed 19a of a catalyst promoting the selective oxidation of $H_2S$ to sulphur. The intermediate catalytic oxidation stage 4a has a first end 20a and a second end 21a which are separated by a stationary bed 22a of a catalyst for selective oxidation of $H_2S$ to sulphur. The final catalytic oxidation stage 5a has a first end 23a and a second end 24a which are separated by a stationary bed 25a of a catalyst of selective oxidation for $H_2S$ to sulphur. The second end 18a of the initial catalytic oxidation stage 3a is adjacent to the first end 20a of the intermediate catalytic oxidation stage 4a and communicates with the latter via a connecting conduit 26a in which an indirect heat exchanger 27a is fitted. Similarly, the second end 21a of the intermediate catalytic oxidation stage 4a is adjacent to the first end 23a of the final catalytic oxidation stage 5a and communicates with the latter via a connecting conduit 28a in which an indirect heat exchanger 29a is fitted.

In the catalytic oxidation unit 2b the initial catalytic oxidation stage 3b has a first end 17b and a second end 18b which are separated by a stationary bed 19b of a catalyst promoting the selective oxidation of $H_2S$ to sulphur. The intermediate catalytic oxidation stage 4b has a first end 20b and a second end 21b which are separated by a stationary bed 22b of a catalyst for selective oxidation of $H_2S$ to sulphur. The final catalytic oxidation stage 5b has a first end 23b and a second end 24b which are separated by a stationary bed 25b of a catalyst of selective oxidation for $H_2S$ to sulphur. The second end 18b of the initial catalytic oxidation stage 3b is adjacent to the first end 20b of the intermediate catalytic oxidation stage 4b and communicates with the latter via a connecting conduit 26b in which an indirect heat exchanger 27b is fitted. Similarly, the second end 21b of the intermediate catalytic oxidation stage 4b is adjacent to the first end 23b of the final catalytic oxidation stage 5b and communicates with the latter via a connecting conduit 28b in which an indirect heat exchanger 29b is fitted.

The first end 17a of the initial catalytic oxidation stage 3a of the catalytic oxidation unit 2a is provided with a conduit 30a which is connected, on the one hand, via a conduit 31a provided with a valve 32a to the conduit 16 extending the indirect heat exchanger 15 and, on the other hand, via a conduit 33a provided with a valve 34a, to a conduit 35, itself connected to the suction orifice of a blower 36 and in which a sulphur condenser 37 is fitted.

Similarly, the first end 17b of the initial catalytic oxidation stage 3b of the catalytic oxidation unit 2b is provided with a conduit 30b which is connected, on the one hand, via a conduit 31b provided with a valve 32b to the abovementioned conduit 16 and, on the other hand, via a conduit 33b provided with a valve 34b to the said conduit 35 at a point of this conduit which is situated between the sulphur condenser 37 and the conduit 33a.

The second end 24a of the final catalytic oxidation stage 5a of the catalytic oxidation unit 2a is provided with a conduit 38a which is connected, on the one hand, via a conduit 39a provided with a valve 40a to a discharge conduit 41 for the purified residual gas and, on the other hand, via a conduit 42a provided with a valve 43a to a conduit 44 extending the delivery orifice of the blower 36. The conduit 44 passes through a heater 45 and carries a branch 46 which is provided with a valve 47 and short-circuits the heater, and it also comprises a valve 48 situated between the heater and the part of the branch 46 situated upstream of the heater.

Similarly, the second end 24b of the final catalytic oxidation stage 5b of the catalytic oxidation unit 2b is provided with a conduit 38b which is connected, on the one hand, via a conduit 39b provided with a valve 40b to the said conduit 41 for discharging the purified residual gas and, on the other hand, via a conduit 42b provided with a valve 43b to the conduit 44 between the branch 46 and the conduit 42a.

An air delivery conduit 49 is connected, via a conduit 50 provided with a controllable-opening valve 51, to the conduit 14, connected to the conduit 16 through the heat exchanger 15, for injecting air into the initial catalytic oxidation stage 3a of the catalytic oxidation unit 2a and into the initial catalytic oxidation stage 3b of the catalytic oxidation unit 2b. The air delivery conduit 49 additionally carries a branch connection 52a connected via a conduit 53a, provided with a controllable-opening valve. 54a, to the conduit 26a upstream of the heat exchanger 27a, for injecting air into the intermediate catalytic oxidation stage 4a of the catalytic oxidation unit 2a, the said branch connection 52a also being connected via a conduit 55a, provided with a controllable-opening valve 56a, to the conduit 28a upstream of the heat exchanger 29a, for injecting air into the final catalytic oxidation stage 5a of the catalytic oxidation unit 2a. The conduit 49 also carries a branch connection 52b connected via a conduit 53b, provided with a controllable-opening valve 54b, to the conduit 26b upstream of the heat exchanger 27b, for injecting air into the intermediate catalytic oxidation stage 4b of the catalytic oxidation unit 2b, the said branch connection 52b also being connected via a conduit 55b, provided with an controllable-opening valve 56b, to the conduit 28b upstream of the heat exchanger 29b, for injecting air into the final catalytic oxidation stage 5b of the catalytic oxidation unit 2b.

A temperature controller 57a, whose sensitive element is placed in the end 18a of the initial catalytic oxidation stage 3a of the catalytic oxidation unit 2a, and a temperature controller 57b whose sensitive element is placed in the end 18b of the initial catalytic oxidation stage 3b of the catalytic oxidation unit 2b provide the control of the opening of the valve 51 fitted in the conduit 50, which makes it possible to adjust the flow rate of air introduced into the initial catalytic oxidation stage 3a or the initial stage 3b and thus the maintaining of the temperature at the exit of these stages at the chosen value. A temperature controller 58a whose sensitive element is placed in the end 21a of the intermediate catalytic oxidation stage 4a of the catalytic oxidation unit 2a provides the control of the opening of the valve 54a placed in the air injection conduit 53a, to maintain the temperature at the exit of the intermediate stage at the required value. Similarly a temperature controller 58b whose sensitive element is placed in the end 21b of the intermediate catalytic oxidation stage 4b of the catalytic oxidation unit 2b provides the control of the opening of the valve 54b placed in the air injection conduit 53b, to maintain the temperature at the exit of the intermediate stage at the appropriate value. An oxygen content regulator 59 is fitted in the discharge conduit 41 for the purified residual gas downstream of the conduits 39a and 39b and controls the opening of the valve 56a fitted in the conduit 55a for injecting air into the final catalytic oxidation stage 5a of the catalytic oxidation unit 2a or else the opening of the valve 56b fitted in the conduit 55b for injecting air into the final catalytic oxidation stage 5b of the catalytic oxidation unit 2b, which provides the adjustment of the flow rate of excess air introduced into the final catalytic oxidation stage 5a or the final stage 5b. A temperature controller 60a whose sensitive element is placed in the end 24a of the final catalytic oxidation stage 5a of the catalytic oxidation unit 2a, and a temperature controller 60b whose sensitive element is placed in the end 24b of the final catalytic oxidation stage 5b of the catalytic oxidation unit 2b, make it possible to maintain the temperature in the final stage 5a or the final stage 5b at the required value.

The final catalytic oxidation stage 5a of the catalytic oxidation unit 2a, as well as the final catalytic oxidation stage 5b of the catalytic oxidation unit 2b, may be equipped with a system for maintaining the temperature of the catalyst bed, it being possible for the system to be of any known type and to consist, for example, of a coil which is placed within the catalyst bed present in the said final stage and through which passes a fluid at an appropriate temperature.

A balancing conduit 61 provided with a valve 62 connects the conduit 16, at a point in this latter conduit situated between the heat exchanger 15 and the junction of the conduit 16 and of the conduit 31a, to the conduit 35, at a point in this conduit 35 situated between the blower 36 and the sulphur condenser 37, while a purge conduit 63 provided-with a valve 64 connects the conduit 44, at a point in the latter situated between the blower 36 and the heater 45, to the conduit 9 at a point in the latter situated upstream of the heat exchanger 10.

The operation of the plant described above can be outlined simply as follows.

It is assumed that the catalytic oxidation unit 2a is in a reaction phase and that the catalytic oxidation unit 2b is in a regeneration phase, the valves 32a, 40a, 34b, 43b, 54a, 56a and 48 being open, whereas the valves 34a, 43a, 32b, 40b, 54b, 56b and 47 are closed, the balancing, 62, and purging valves being open.

The residual gas delivered from the sulphur plant via the conduit 9 passes through the heat exchanger 10 and then passes through the burner 11, in which it is mixed with the combustion gases produced by this burner, which performs a combustion of fuel gas, delivered via the pipe 12, by means of air, delivered via the pipe 13, while operating below stoichiometry to provide, in addition to the heat energy, an appropriate quantity of $H_2$ and of CO. As it passes through the burner 11, the residual gas is heated by the combustion gases to the temperature required for the hydrogenation and the hydrolysis, for example 200° C. to 400° C. and, at the same time it also receives the hydrogen and the CO produced during the combustion. The hot mixture of residual gas and of combustion gases, originating from the burner 11, flows into the hydrogenation and hydrolysis reactor 1 containing an appropriate quantity of a catalyst capable of promoting the hydrogenation of $SO_2$ and of elemental sulphur to $H_2S$, as well as the hydrolysis of the compounds COS and $CS_2$ to $H_2S$, the catalyst being, for example, based on cobalt and molybdenum. In the reactor 1 the sulphur compounds other than $H_2S$ which are present in the residual gas are converted virtually completely to $H_2S$. The gaseous effluent leaving, via the conduit 14, the reactor 1, the temperature of which is of the order of 280° C. to 450° C., then flows into the heat exchanger 10, where it heats the residual gas flowing via the conduit 9 and then has added to it an initial quantity of air via the conduit 50, through the controllable-opening valve 51, and the mixture thus formed is cooled in the heat exchanger 15 to obtain, at the exit of the exchanger 15, a cooled initial reaction gas mixture the temperature of which is in the range 80° C. –100° C.

The said initial gaseous reaction mixture is introduced, via the conduit 16 and the conduits 31a and 30a, into the initial catalytic oxidation stage 3a of the catalytic oxidation unit 2a. In this initial catalytic oxidation stage 3a a fraction of $H_2S$ of the initial gaseous reaction mixture entering the stage is selectively oxidized to sulphur by the air present in this reaction mixture, in contact with the oxidation catalyst present in this stage, the sulphur formed being deposited on the catalyst. The oxidation is carried out adiabatically with adjustment of the quantity of air delivered to the initial stage 3a, the adjustment being provided by the temperature controller 57a actuating the valve 51, with the result that the temperature of the gas mixture resulting from the oxidation is maintained at a value at most equal to the maximum temperature θs above which the oxidation catalyst no longer has the required selectivity for sulphur. The gas mixture originating from the initial catalytic oxidation stage 3a, via the conduit 26a, has added to it, upstream of the heat exchanger 27a, an intermediate quantity of air, delivered via the conduit 53a through the controllable-opening valve 54a, to constitute an intermediate reaction mixture which, after cooling to a temperature in the range 80° C. –100° C. in the heat exchanger 27a, is introduced into the intermediate stage 4a of the catalytic oxidation unit 2a. In this intermediate stage 4a a fraction of the $H_2S$ still present in the intermediate gaseous reaction mixture entering the intermediate stage is oxidized selectively to sulphur by the air present in this intermediate reaction mixture, in contact with the oxidation catalyst present in this stage, the sulphur formed being deposited on the catalyst. The oxidation is carried out adiabatically with adjustment of the quantity of air delivered to the intermediate stage 4a, the adjustment being provided by the temperature controller 58a actuating the valve 54a with the result that the temperature of the gas mixture resulting from the oxidation is maintained at a value at most equal to the maximum temperature θs, above which the oxidation catalyst no longer has the required selectivity for sulphur. The gas mixture originating from the intermediate catalytic oxidation stage 4a, via the conduit 28a, has added to it, upstream of the heat exchanger 29a, a final quantity of excess air delivered via the conduit 55a through the controllable-opening valve 56a, to constitute a final reaction mixture which, after cooling to a temperature in the range 80° C. –100° C. in the heat exchanger 29a, is introduced into the final stage 5a of the catalytic oxidation unit 2a. In this final stage 5a all of the $H_2S$ present in the final gaseous reaction mixture entering the said stage is selectively oxidized to sulphur by the excess air present in this reaction mixture, in contact with the oxidation catalyst present in this stage, the sulphur formed being deposited on the catalyst. The excess of air delivered to the final catalytic oxidation stage 5a is chosen so as to ensure a total removal of the $H_2S$ present in the reaction gas mixture flowing into the final stage without formation of $SO_2$ in contact with the sulphur formed by the reaction and deposited on the catalyst. The control of the excess of air is provided by the oxygen content regulator 59 fitted in the conduit 41 for discharging the purified residual gas and actuating the valve 56a. The temperature in the final stage 5a is at most equal to θs without, however, exceeding 150° if θs were higher than this temperature. The maintaining of the oxidation temperature in the final stage 5a can be ensured by the temperature controller 60a. If need be, in order to make it easier to maintain the oxidation temperature in the final stage 5a, the catalyst bed present in this stage may be cooled by indirect heat exchange with a cold fluid circulating, for example, in a conduit within the catalyst bed or by any other known method.

A virtually totally purified residual gas leaves via the conduit 38a and is directed, via the conduit 39a through the valve 40a, into the discharge conduit 41 for the purified residual gas.

A stream of nonoxidizing purging gas is delivered by the blower 36 into the conduit 44 through the valve 48 and the heater 45, in which this gas stream is heated to the appropriate temperature for regeneration. The heated gas stream travelling in the conduit 44 is introduced into the catalytic oxidation unit 2b via the conduit 42b, through the valve 43b and the conduit 38b, and purges first of all the sulphur-laden oxidation catalyst 25b present in the stage 5b of the catalytic oxidation unit 2b and then, after flowing via the conduit 28b, it purges the sulphur-laden oxidation catalyst 22b present in the stage 4b of the catalytic oxidation unit 2b and finally, after flowing via the conduit 26b, it purges the sulphur-laden oxidation catalyst 19b of the stage 3b of the catalytic oxidation unit 2b. The stream of purging gas carrying away the vaporized sulphur leaves the catalytic oxidation unit 2b via the conduit 30b and flows via the conduit 33b, through the valve 34b, as far as the sulphur condenser 37, in which most of the sulphur is separated off by condensation. At the exit of the condenser 37 the stream of purging gas is picked up again by the blower 36, to be delivered into the conduit 44 as indicated above.

After a sufficient period of purging of the catalysts present in the catalytic oxidation unit 2b by the purging gas flowing in the heater 45, in order to remove completely the sulphur deposited on the catalysts, the valve 47 is opened and the valve 48 is closed so as to short-circuit the heater 45 and to lower the temperature of the purging gas, and the purging is continued for an appropriate period in order to cool the regenerated catalysts 19b, 22b and 25b which are present in the catalytic oxidation stages 3b, 4b and 5b of the catalytic oxidation unit 2b.

When the catalysts have been cooled to a suitable temperature enabling them to be employed again in a reaction phase, the functions of the catalytic oxidation units 2a and 2b are switched, that is to say that the catalytic oxidation unit 2b is brought into a catalytic oxidation phase and the catalytic oxidation unit 2a into a regeneration/cooling phase by closing the valves 32a, 40a, 34b, 43b, 47, 54a and 56a and by opening the valves 34a, 43a, 32b, 40b, 48, 54b and 56b. During the transient period of changeover of the functions of the catalytic oxidation units 2a and 2b the purging gas is circulated in a conduit, not shown, bypassing these units.

To complete the description of the treatment including the use of the process according to the invention, presented above, a concrete example of the said treatment is given below, no limitation being implied.

EXAMPLE

By using a plant similar to that shown diagram-matically in the figure of the appended drawing, and which operates as described above, a residual gas from a sulphur plant which had the following composition, in

| | | | | | |
|---|---|---|---|---|---|
| $H_2S$: | 0.76 | $N_2$: | 60.10 | COS: | 0.01 |
| $SO_2$: | 0.38 | $H_2$: | 2.72 | $CS_2$: | 0.01 |
| $CO_2$: | 2.10 | CO: | 0.34 | | |
| $H_2O$: | 33.51 | $S_1$: | 0.07 | | |

The residual gas originated from a Claus sulphur plant in which the controlled oxidation of a sour gas consisting, by volume, of 90% of $H_2S$ 5.4% of $CO_2$, 4% of water and 0.6% of hydrocarb ons was carried out using air.

The recovery yield of the sulphur plant supplying the residual gas subjected to the treatment was 96.3%

The hydrogenation and hydrolysis reactor contained a catalyst promoting both the hydrolysis of the compounds COS and $CS_2$ to $H_2S$ and the hydrogenation of $SO_2$ and of sulphur vapour to $H_2S$, the catalyst being a catalyst of the cobalt/molybdenum type on alumina support.

The three stages of each of the catalytic oxidation units, each containing a catalyst for selective oxidation of $H_2S$ to sulphur with oxygen, consisting of an alumina with nickel containing 4% of nickel by weight, the catalyst being obtained by impregnating an activated alumina with the aid of the quantity of nickel acetate in aqueous solution, followed by drying of the impregnated alumina at 100° C. and calcining of the dried product at 300° C. for 3 hours. This catalyst had a pore volume of 46 cm$^3$ per 100 g of catalyst and retained the required selectivity for sulphur up to a θs value of 120° C.

The contact time of the gases flowing in the hydrogenation and hydrolysis reactor with the catalyst present in the said reactor was 4 seconds. The contact times of the gases flowing in each of the catalytic oxidation stages of the catalytic oxidation unit operating in a reaction phase with the catalyst present in the stage in question had values of 2 seconds in the case of the initial stage, 3 seconds in the case of the intermediate stage and 5 seconds in the case of the final stage.

The residual gas, delivered via the conduit 9 at a flow rate of 192 kmoles/hour and a temperature of approximately 132° C., was heated to approximately 300° C. after passing through the indirect heat exchanger 10 and the burner 11 and at this temperature entered the hydrogenation and hydrolysis reactor 1.

In the reactor 1 the conversion of $SO_2$, S, COS and $CS_2$ to $H_2S$ was practically complete and the gaseous effluent leaving the said reactor 1 was at a temperature of 330° C. and contained only $H_2S$ as sulphur compound in a volume concentration of 1.2%. This gaseous effluent, the flow rate of which was 198 kmol/h, underwent a first cooling by passing through the heat exchanger 10 and then had added to it 2.1 kmol/h of air at 40° C. via the conduit 50, and the gaseous mixture thus formed was cooled to 90° C. by passing through the heat exchanger 15, to constitute an initial reaction mixture which was introduced, at the temperature, into the initial catalytic oxidation stage 3a of the catalytic oxidation unit 2a via the conduit 16 and then the conduits 31a and 30a.

In this initial stage 3a, operating adiabatically, a fraction of the $H_2S$ was oxidized selectively to sulphur, the sulphur being deposited on the catalyst. The temperature at the exit of the stage reached 120° C. and was maintained at this value by the temperature controller 57a actuating the valve 51 to adjust the flow rate of air delivered via the conduit 50 through this valve. The gas mixture originating from the initial stage 3a had added to it 2.08 kmol/h of air, via the conduit 53a through the valve 54a, and the mixture thus obtained was cooled to 90° C. in the heat exchanger 27a, to form an intermediate reaction mixture which was introduced, at the temperature of 90° C., into the intermediate stage 4a of the catalytic oxidation unit 2a.

In this intermediate stage 4a, operating adiabatically, a new fraction of the $H_2S$ was oxidized selectively to sulphur, the sulphur being deposited on the catalyst. The temperature at the exit of the stage reached 120° C. and was maintained at this value by the temperature controller 58a actuating the valve 54a to adjust the flow rate of air delivered via the conduit 53a through this valve. The gas mixture originating from the intermediate stage 4a had added to it 2.4 kmol/h of air, via the conduit 55a through the valve 56a, and the mixture thus obtained was cooled to 90° C. in the heat exchanger 29a, to form a final reaction mixture which was introduced at the temperature of 90° C. into the final stage 5a of the catalytic oxidation unit 2a. The above-mentioned quantity of air represents approximately 1.5 times the stoichiometric quantity of air needed for the oxidation to sulphur of the $H_2S$ present in the final reaction mixture.

In this final stage 5a all of the $H_2S$ present in the final reaction mixture was oxidized to sulphur, the sulphur being deposited on the catalyst. A purified residual gas which was at a temperature of 112.5° C. and which had an oxygen volume content of 0.08% was discharged via the conduit 38a from the final catalytic oxidation stage 5a of the catalytic oxidation unit 2a and the said purified gas was conveyed via the conduit 39a through the valve 40a into the discharge conduit 41 for the purified residual gas.

The excess of air corresponding to the above-mentioned oxygen volume content in the purified residual gas discharged via the conduit 41 is maintained by the oxygen content controller 59, which actuates the valve 56a to adjust the flow rate of air delivered via the conduit 55a through this valve.

The treated residual gas discharged via the conduit 41 now contained only traces, namely less than 200 ppm by volume, of sulphur compounds.

The purging gas employed for the regeneration of the sulphur-laden catalysts in the catalytic oxidation stages 3b, 4b and 5b of the catalytic oxidation unit 2b in a regeneration/cooling phase, was introduced via the conduit 38b into the catalytic oxidation unit 2b after having been brought to a temperature of between 250° C. and 350° C. and successively purged the sulphur-laden catalysts in the final stage 5b, in the intermediate stage 4b and in the initial stage 3b of the catalytic oxidation unit 2b. The sulphur-laden purging gas originating from the catalytic oxidation unit 2b in a regeneration phase, via the conduit 30b, then flowed into the sulphur condenser 37 of the regeneration circuit to be cooled therein to approximately 125° C. so as to separate off most of the sulphur which it contained, and then it returned to the heater 45 to be employed again for the regeneration. The regenerated catalysts were next cooled by passing through the catalytic oxidation unit 2b containing them the purging gas originating from the sulphur condenser 37 and travelling via the branch 46 short-circuiting the heater 45.

The catalytic oxidation units 2a and 2b operated alternately for 30 hours in a reaction phase and for 30 hours, including 10 hours of cooling, in a regeneration/cooling phase.

The sulphur yield of the combined unit comprising the sulphur plant supplying the residual gas to be treated and the plant including the hydrogenation and hydrolysis reactor and the catalytic oxidation units 2a and 2b, each containing three stages of catalyst promoting the selective oxidation of $H_2S$ to sulphur and operating according to the invention, was higher than 99.9%.

We claim:

1. A process for the oxidation to sulphur of the $H_2S$ present in a gas in a concentration of between 0.7% and 3% by volume, in which the operation is carried out in a catalytic oxidation unit comprising a plurality of catalytic oxidation stages arranged in series and including an initial stage, a final stage and optionally at least one intermediate stage, each of the stages containing a catalyst promoting the selective oxidation of $H_2S$ to sulphur and operating at temperatures which are lower than the dew point of the sulphur resulting from the oxidation, wherein the gas to be treated containing $H_2S$ is introduced at the entry of the initial catalytic oxidation stage and the gas is successively passed through each of the catalytic oxidation stages in contact with the oxidation catalyst and additionally injecting a gas containing free oxygen into each of the initial and intermediate catalytic oxidation stages in order to carry out in each of the initial and intermediate catalytic oxidation stages a partial oxidation of the $H_2S$ in the gas to sulphur by the oxygen in the gas containing free oxygen, the sulphur formed being deposited on the catalyst in each catalytic oxidation stage, and a purified gas with a low residual content of $H_2S$ is discharged at the exit of the final catalytic oxidation stage, wherein the gas containing $H_2S$ is brought to a temperature of between 80° C. and 100° C. before it enters each of the catalytic oxidation stages, the quantity of gas containing free oxygen introduced into the initial stage and each of the optional intermediate stages of catalytic oxidation being substoichiometric with respect to the quantity of hydrogen sulfide in the gas so that the temperature of the gas mixture at the exit of each of the catalytic oxidation stages which operate adiabatically, is at most equal to the maximum temperature θs of the temperature range in which the oxidation catalyst is capable of promoting the required selective oxidation of $H_2S$ to sulphur and does not exceed 150° C., in that the quantity of gas containing free oxygen which is introduced into the final catalytic oxidation stage is controlled in order to provide an excess of oxygen in the purified gas above that required for a total oxidation of the $H_2S$ passing through the final stage and wherein the oxidation of the $H_2S$ in the final catalytic oxidation stage is carried out at temperatures which are at most equal to the temperature θs and not exceeding 150° C., by cooling the final catalytic stage by indirect heat exchange with a cold fluid if required to maintain the required temperature.

2. The process according to claim 1, wherein the gas containing $H_2S$ is brought to the temperature between 80° C. and 100° C. before it is introduced into each of the catalytic oxidation stages into which it is to be injected, by indirect heat exchange, external to the catalytic oxidation stages, with a fluid which is at an appropriate temperature.

3. The process according to claim 1 wherein the gas containing free oxygen is premixed with the gas containing $H_2S$ before they are introduced into each of the catalytic oxidation stages.

4. The process according to claim 2 wherein the gas containing free oxygen is premixed with the gas containing $H_2S$ before the indirect heat exchange step to bring the temperature of the gas between 80° C. and 100° C. before it is introduced into each of the catalytic oxidation stages.

5. The process according to claim 1 wherein the catalyst for selective oxidation of H₂S to sulphur, present in each of the catalytic oxidation stages of the catalytic oxidation unit, has a pore volume ranging from 15 cm³ to 70 cm³ per 100 g of catalyst.

6. The process according claim 1 wherein the oxidation catalyst consists of an active phase consisting of one or more oxides and/or salts of one or a number of transition metals, which is deposited on a support of a refractory material or on an active carbon support.

7. The process according to claim 6, wherein the active phase, calculated as weight of metal, represents 0.1% to 15% by weight of the oxidation catalyst.

8. The process according to claim 1 wherein the catalytic oxidation unit contains three catalytic oxidation stages, comprising an initial stage and a final stage which are separated by an intermediate stage.

9. The process according to claim 1 wherein the sulphur-laden oxidation catalysts present in the catalytic oxidation stages of the catalytic oxidation unit are regenerated by successively purging the catalysts by means of a non-oxidizing gas, the operation being carried out at temperatures between 200° C. and 500° C., in order to vaporize the sulphur retained on the catalysts, and then cooling the regenerated catalysts to the temperature required for a new application of the catalytic oxidation reaction, the cooling being produced by means of a gas which is at an appropriate temperature, which cooling gas optionally contains water vapor at least during the final phase of the cooling.

10. The process according to claim 9, which further comprises a number of catalytic oxidation units, the units being arranged so that at least one of the units is in a regeneration/cooling phase wherein the other units are in a catalytic oxidation phase or that at least one catalytic oxidation unit is in a regeneration phase and at least one catalytic oxidation unit is in a cooling phase, and wherein the other catalytic oxidation units are in a catalytic reaction phase.

11. The process according to claim 1 for the treatment of a gas containing H₂S in a volume concentration of between 0.7% and 3%, which as is obtained by passing a residual gas from a sulphur plant through a hydrogenation and hydrolysis zone to convert to H₂S the sulphur products present in the residual gas.

12. The process of claim 9 wherein the operation is carried out at a temperature from 250° C. to 450° C.

13. The process of claim 2 wherein the gas containing free oxygen is premixed with the gas containing H₂S before they are introduced into each of the catalytic oxidation stages.

14. The process of claim 2 wherein the catalyst for selective oxidation of H₂S to sulphur, present in each of the catalytic oxidation stages of the catalytic oxidation unit, has a pore volume ranging from 15 cm³ to 70 cm³ per 100 g of catalyst.

15. The process of claim 14 wherein the catalytic oxidation unit contains three catalytic oxidation stages, comprising an initial stage and a final stage which are separated by an intermediate stage.

16. The process of claim 6 wherein the active phase, calculated as weight of metal, is 0.2% to 7% by weight of the oxidation catalyst.

17. The process of claim 2 wherein the sulphur-laden oxidation catalysts present in the catalytic oxidation stages of the catalytic oxidation unit are regenerated by successively purging the catalysts by means of a non-oxidizing gas, the operation being carried out at temperatures between 200° C. and 500° C., in order to vaporize the sulphur retained on the catalysts, and then cooling the regenerated catalysts to the temperature required for a new application of the catalytic oxidation reaction, the cooling being produced by means of a gas which is at an appropriate temperature, which cooling gas optionally contains water vapor at least during the final phase of the cooling.

18. The process of claim 2 for the treatment of a gas containing H₂S in a volume concentration of between 0.7% and 3%, which gas is obtained by passing a residual gas from a sulphur plant through a hydrogenation and hydrolysis stage to convert to H₂S the sulphur products present in the residual gas.

19. The process of claim 17 wherein the operation is carried out at a temperature from 250° C. to 450° C.

20. A process for the oxidation to sulphur of the H₂S present in a gas in a concentration of between 0.7% and 3% by volume, which comprises:

carrying out the oxidation in at least one catalytic oxidation unit comprising a plurality of catalytic oxidation stages arranged in series and including an initial stage, a final stage and optionally at least one intermediate stage, each of the stages containing a catalyst capable of promoting the selective oxidation of H₂S to sulphur and operating at temperatures ranging from 90° C. to 130° C., introducing the gas to be treated containing H₂S at the entry of the initial catalytic oxidation stage and passing the gas successively through each of the catalytic oxidation stages in contact with the oxidation catalyst, injecting a gas containing free oxygen in an amount that is substoichiometric with respect to the amount of hydrogen sulfide in the gas to be treated into each of the catalytic oxidation stages in order to carry out in each catalytic oxidation stage a partial oxidation of the H₂S in the gas passing through this stage to sulphur by the oxygen in the gas containing free oxygen, the sulphur formed being deposited on the catalyst in each catalytic oxidation stage, discharging a purified gas with a low residual content of H₂S at the exit of the final catalytic oxidation stage, bringing the gas containing H₂S to a temperature of between 80° C. and 100° C. before it enters each of the catalytic oxidation stages, controlling the quantity of gas containing free oxygen introduced into the initial stage and each of the optional intermediate stages of catalytic oxidation so that the temperature of the gas mixture at the exit of each of these catalytic oxidation stages which operate adiabatically, is at most equal to 130° C., controlling the quantity of gas containing free oxygen which is introduced into the final catalytic oxidation stage to provide an excess of oxygen in the purified gas above that required for a total oxidation of the H₂S passing through the final stage, and carrying out the oxidation of the H₂S in the final catalytic oxidation stage at temperatures which are at most equal to 130° C., by cooling the final catalytic stage by indirect heat exchange with a cold fluid if required to maintain the required temperature.

\* \* \* \* \*